United States Patent
De Nure

[15] 3,657,821
[45] Apr. 25, 1972

[54] VEHICLE ORIENTING DEVICE AND METHOD

[72] Inventor: Peter A. De Nure, 21 Upper Loudon Road, Loudonville, N.Y. 12211

[22] Filed: Dec. 31, 1969

[21] Appl. No.: 889,638

Related U.S. Application Data

[63] Continuation-in-part of Ser. No. 621,913, Mar. 9, 1967, abandoned.

[52] U.S. Cl. ............................................................33/46 AS
[51] Int. Cl. ......................................................G01c 5/00
[58] Field of Search ................................................33/46 AS

[56] References Cited

UNITED STATES PATENTS

| | | | |
|---|---|---|---|
| 1,754,014 | 4/1930 | Fowler | 33/46 AS |
| 2,046,581 | 7/1936 | Reeves | 33/46 AS |
| 2,672,841 | 3/1954 | Nitzberg | 33/46 AS |
| 2,753,439 | 7/1956 | Greenfield | 33/46 AS |

Primary Examiner—Leonard Forman
Assistant Examiner—Steven L. Stephan

[57] ABSTRACT

An orienting device for enabling the operator of a moving vehicle to maintain the vehicle a predetermined distance from a reference line at the right side of a lane on a road or the edge of the road. The device comprises a sighting member positioned on the front portion of the top of the hood of the vehicle along that line of sight of the operator which, with the operator in his normal driving position and the vehicle disposed parallel to and at the predetermined distance from the reference line, both is tangent to the right front portion of the hood of the vehicle and intersects the reference line on the road.

2 Claims, 4 Drawing Figures

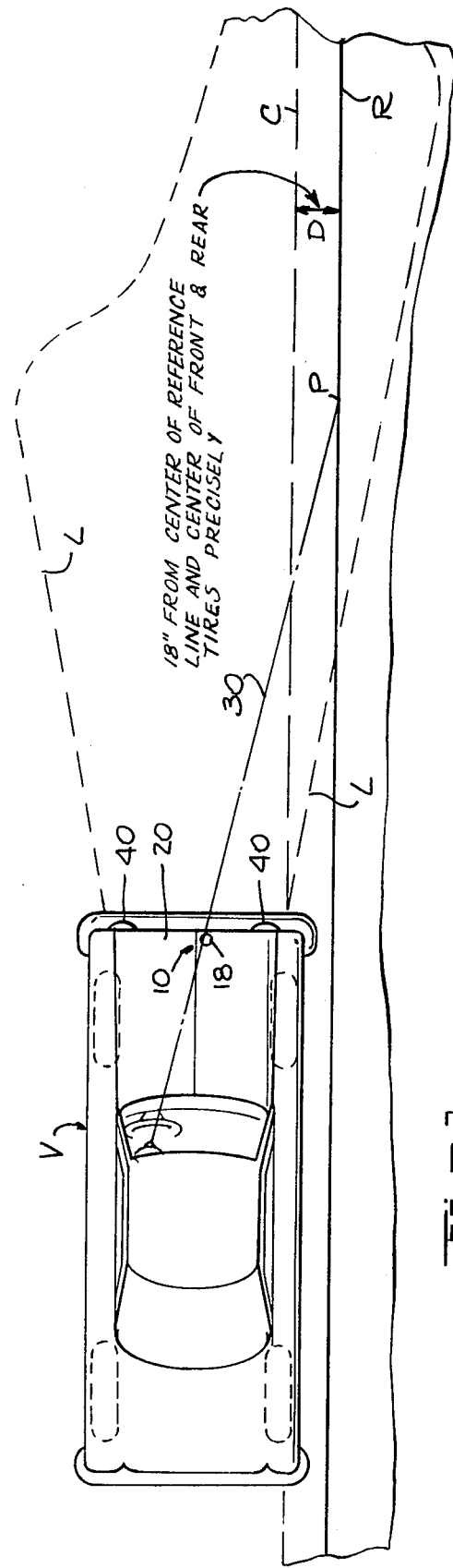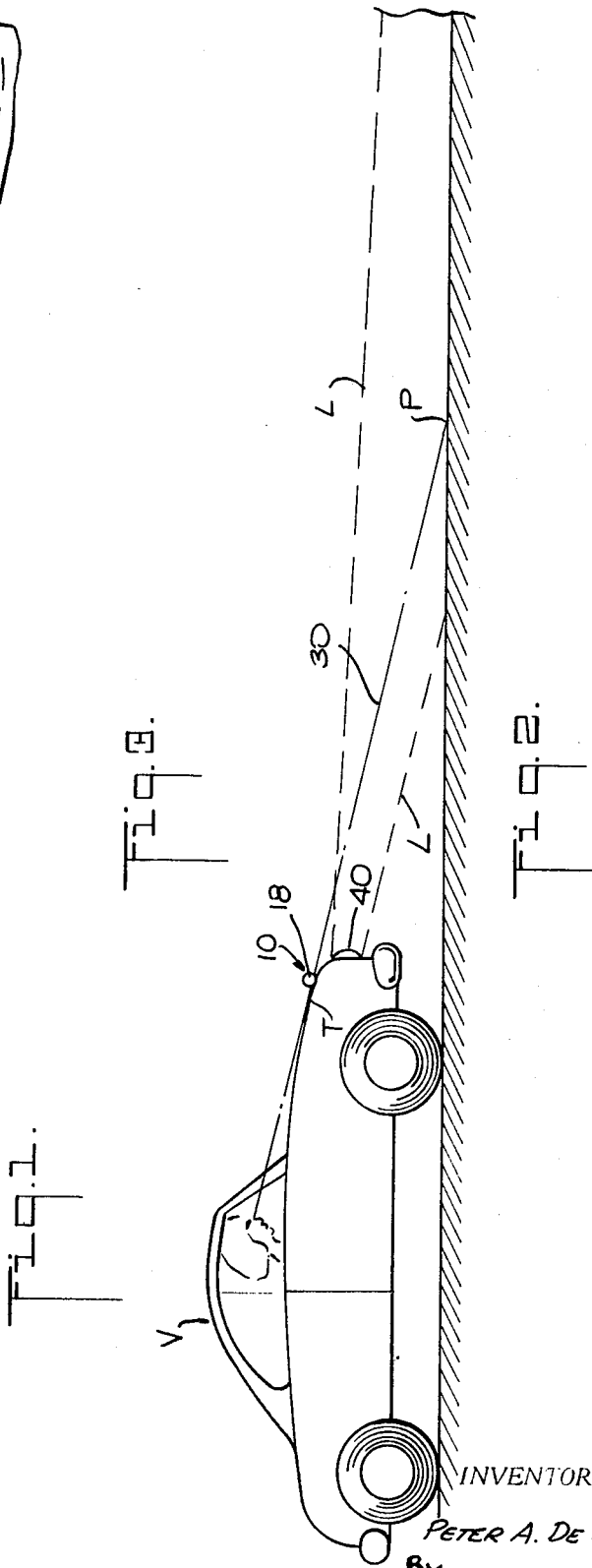

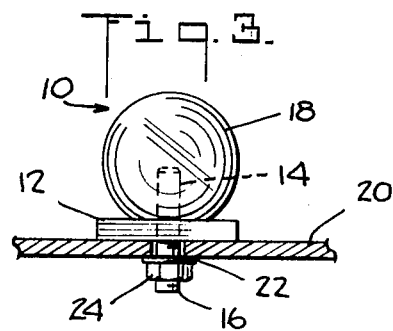
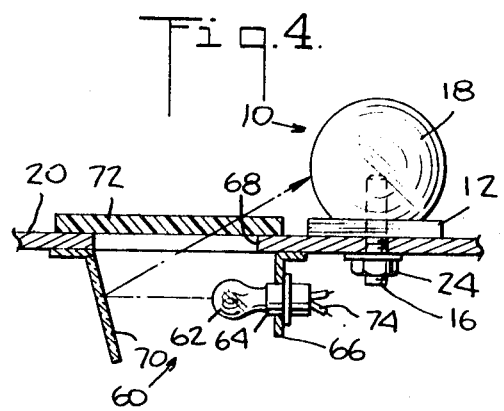

VEHICLE ORIENTING DEVICE AND METHOD

CROSS-REFERENCE TO RELATED APPLICATION

This application is a continuation-in-part of my copending application Ser. No. 621,913, filed Mar. 9, 1967, now abandoned and entitled Vehicle Orienting Device and Method.

BACKGROUND OF THE INVENTION

Various orienting devices and methods have heretofore been employed to assist the driver of a moving vehicle in maintaining the movement of the vehicle along a path which is both parallel to the road and properly spaced from the side of a lane in the road. These devices and methods generally have involved the positioning of sighting members in the forward field of vision of the operator and the alignment by the operator of the sighting member with a point ahead of the vehicle on a reference line formed by the lane marker or side edge of the road.

The known devices and methods have not been entirely satisfactory from the standpoint of safety, nor have they been effective for use at night and during periods of poor visibility. The reason for this is that in prior devices the sighting members have generally been positioned at elevated locations on the vehicle so that, in use, a driver aligns the sighting member with a point on a line which is far in advance of the vehicle. In consequence of this, when the operator aligns such sighting member with the line on a curved portion of the road ahead of the vehicle, the position of the vehicle in its lane is inherently inadvertently shifted by the amount of the curvature of the road so as to cause the vehicle to tend to leave its proper lane. The same phenomenon occurs where pronounced dips and elevations are encountered in the road. In addition, the prior art alignment of the sighting member with a point on the line far ahead of the vehicle decreases the opportunity of using such devices during darkness and other periods of limited visibility due to the normal limitations of the headlight systems of such vehicles. Further, the elevated locations of the sighting members in the prior art arrangements are distracting to the operators and form significant "blind spots" which increase the risk of accidents.

SUMMARY OF THE INVENTION

The present invention overcomes the disadvantages of the prior art arrangements by providing a vehicle orienting device and method in which an illuminable sighting member is positioned at a particular, optimum location on the vehicle so that, in use, the driver aligns the sighting member with a point on the reference line or edge of the right side of the road that is as close in to the vehicle as possible.

Accordingly, it is one object of this invention to provide a vehicle orienting device and method, with proper spacing as shown in FIG. 1 of the drawings.

Another object of this invention is to provide a vehicle orienting device and method in which the operator aligns at a glance (without turning his head) the sighting member of the device with a nearby point on the lane or road edge-defining reference line.

A further object of this invention is to provide a vehicle orienting check point and method in which the sighting member is positioned on the right front portion of the top of the hood of the vehicle along that line of sight of the operator thereof which both is tangent to the right front portion of the hood of the vehicle and intersects the lane or road edge-defining reference line.

Yet another object of this invention is to provide a vehicle orienting device having improved capabilities for use at night and during periods of limited visibility.

Further objects and advantages of this invention will become apparent as the following description proceeds.

Briefly stated, and in accordance with one embodiment of this invention, there is provided an orienting device for enabling the operator of a moving vehicle to maintain the vehicle a predetermined distance from a reference line at the right side of a lane on the road. The device comprises a sighting member positioned on the right front portion of the hood of the automobile or truck vehicle along that line of sight of the operator which, with the operator in his normal driving position and the vehicle disposed parallel to and at the predetermined distance from the reference line, both is tangent to the right front portion of the hood of the vehicle and intersects the reference line on the road.

The invention further provides a method for mounting an orienting device on a vehicle that is adapted to be driven by an operator. The method comprises positioning the vehicle parallel to and a predetermined distance to the left of a reference line, and then mounting the sighting member of the device on the front portion of the hood of the vehicle along that line of sight of the operator which, with the operator in his normal driving position, both is tangent to the right front portion of the hood of the vehicle and intersects the reference line on the road, whereby the operator's maintenance of alignment of the device and a reference line at the right side of the road during movement of the vehicle on the road causes the vehicle to move in a path parallel to and at said predetermined distance from the reference line.

BRIEF DESCRIPTION OF THE DRAWINGS

While the specification concludes with one or more claims particularly pointing out and distinctly claiming the subject matter of this invention, it is believed that the invention will be better understood from the following description, taken in conjunction with the accompanying drawings, in which:

FIG. 1 is a plan view of a vehicle equipped with a hood-mounted vehicle orienting device in accordance with this invention and showing the operator's line of sight which is tangent to the hood of the vehicle and intersects a point on a reference line at the side of the road;

FIG. 2 is an elevational view of the vehicle and orienting device shown in FIG. 1;

FIG. 3 is an enlarged elevational view of the orienting device of FIGS. 1-2;

FIG. 4 is an elevational view of another alternate illuminated form of the orienting device.

Referring to FIGS. 1-2 of the drawings, there has been illustrated a vehicle V which is equipped with an orienting device of this invention, shown generally at 10, which device includes a sighting member 18. In establishing the location of the sighting member 18 the vehicle is positioned parallel to a lane or road edge-defining reference line R and the centerline C of the right wheels of the vehicle is spaced a predetermined distance D, for example 18 inches, from the reference line R. At this time the operator of the vehicle, sitting in a normal driving position, looks over the right front portion of the hood of the vehicle to the point at which the reference line R (which may be the right edge of the road, or a lane-marking line) intersects with and disappears behind the right front portion of the vehicle. The operator's line of sight 30 to such point of intersection establishes the line along which the sighting member 18, in all embodiments of this invention, shall be mounted, and the view seen by the operator with the sighting member 18 in position is shown in FIG. 1. The line of sight 30 (FIGS. 1 and 2) is that line of sight of the operator which, with the operator in his normal driving position and the vehicle V disposed parallel to and at a predetermined distance D from the reference line R, both is tangent to the hood 20 of the vehicle, at point T thereof, and intersects a point P on the reference line R. The point P on reference line R is located in an area of high illumination by the headlights 40 of the vehicle, such area being generally defined by the broken line L ahead of the vehicle. The sighting member 18 is preferably mounted as far forward on the top of the hood 20 of the vehicle as is conveniently possible to minimize potential alignment errors due to any lateral movements of the operator's body from the normal driving position during operation of the vehicle. The 18 inch spacing or margin of safety adequately compensates for this lateral movement.

Referring to FIG. 4, there has been illustrated in greater detail one form of vehicle orienting device 10. The device 10 comprises a plate or bracket member 12 having respective screw threaded portions 14 and 16 formed adjacent each side of plate 12 for mounting the sighting member 18 onto plate 12 and for fastening the plate 12 to the hood 20 of the vehicle, the latter by means of a lock washer 22 and a nut 24. Sighting member 18, in this embodiment, may be a solid sphere of any suitable material, for example opaque plastic, is preferred. It is preferably 1½ inches in diameter and reddish-orange in color; however, any suitable size, shape and color may be used for the sighting member and still come within the broader aspects of this invention. A strong adhesive material, for example epoxy resin, may be employed to bond the various parts of device 10 together after assembly in order to prevent undesired disassembly of the same though vibration or other means.

The various bolts and rods used to affix the sighting members 18 to the vehicle V in the various embodiments described above are preferably made of a plastic material which will break off in the event of accidents in order to minimize potential injury to persons involved in such accidents.

FIG. 4 wherein an illuminating means, shown generally at 60, is provided which comprises a bulb 62 mounted in a socket 64, the socket being supported by a bracket 66 fastened to the underside of hood 20 or fan or radiator housing under the hood adjacent an opening 68 therein. Light from the bulb 66 is reflected from a suitable reflector or mirror 70, which is fastened to the undersurface of the hood 20, through the opening 68 against the rear surface of sighting member 18. A suitable clear plastic cover 72 is cemented over the opening 68 to seal the same from the elements, and suitable wires 74 are employed to electrically connect the bulb 62 to the electrical system of the vehicle. They are connected with the headlight switch and actuated thereby.

Once an orienting device 10 in accordance with any of the foregoing embodiments has been installed on a vehicle in the manner described, the vehicle may be used by any operator without requiring repositioning of the sighting member 18. The reason for this is that, for the new operator, the line of sight 30 (FIGS. 1 and 2) which is tangent to the hood 20 and passes through the sighting device 18 intersects the road at the reference line C. When the vehicle is driven by the new operator and the sighting member is aligned with the reference line R this results in a shifting of the vehicle into a new path which is parallel to the original path but transversely displaced therefrom by the aforementioned few inches, the amount of displacement being well within the margin of safety available when the distance D (FIG. 1) is properly selected in the first instance. This, plus the fact that seat adjustment forward and back compensates for differences in operator size and the fact that the physical size of the sighting member automatically compensates for minor variations in the line of sight 30, allow vehicles equipped with the orienting device 10 to be used by a multiplicity of different operators. Moreover, since this is the case, the orienting devices 10 can be installed as original equipment on new vehicles during their manufacture, using an average-sized operator's line of sight as a standard for positioning the check point 18. Similarly, since the check up 18 can be installed during manufacture of the vehicle, it may take the form of an integral protrusion on the right front portion of the hood of the vehicle instead of being a separately mounted member as described in the foregoing embodiments. Also, the housing for the illuminating means in such case could take the form of an integral protrusion on the hood of the vehicle, such as "air scoops" or vents located between the driver and the check point 18, but should not protrude in a manner which would in any way block the driver's line of sight.

It will be apparent from the foregoing description that, in a vehicle equipped with a vehicle orienting device 10 in accordance with the present invention, the operator can glance at the check point 18 and be instantly informed of the vehicle's position on the road. When an illuminated check point 18 is employed, the device 10 is usable during night driving and other periods of low visibility (so long as the right edge marker of the lane or road or edge of the road where there is no line can be seen with the aid of the vehicle's headlights). The device 10 is particularly effective as an aid in avoiding the blinding headlights of oncoming traffic, by not looking directly at oncoming lights or centerline of road and provides the foregoing safety features without introducing any significant blindspots into the operator's forward field of vision.

While particular embodiments of this invention have been shown and described, it will be obvious to those skilled in the art that various other changes and modifications may be made without departing from this invention in its broader aspects, and it is, therefore aimed in the appended claims to cover all such modifications as fall within the true spirit and scope of this invention.

Having thus described the invention, what is claimed as new and desired to be protected by Letters Patent is:

1. An orienting device for enabling the operator of a moving vehicle to maintain a predetermined distance from a reference line at the right side of a lane on a road, the device comprising a sighting member positioned on the front portion of the vehicle along that line of sight of the operator which, with the operator in his normal driving position and the vehicle disposed parallel to and at said predetermined distance from the reference line, both is tangent to a portion of the right front of the vehicle and intersects said reference line on the road, and further including means positioned rearwardly of said sighting member for illuminating at least the rear portion of said sighting member, said illuminating means being positioned within the outer shell of the vehicle and directing light through an aperture in said shell toward said sighting member, and wherein said illuminating means include a light bulb and a mirror, said mirror being so positioned as to reflect light from said bulb through said aperture to said sighting member, and further including transparent means carried on said shell to seal said aperture from the elements.

2. A method for mounting an orienting device including a sighting member on a vehicle that is adapted to be driven by an operator, comprising positioning the vehicle parallel to and at a predetermined distance from the left of a reference line, mounting said sighting member on the front portion of the vehicle along that line of sight of the operator which, with the operator in his normal driving position, both is tangent to the right front portion of the hood of the vehicle and intersects said reference line, whereby the operator's maintenance of alignment of the sighting member and a reference line at the right side of the road during movement of the vehicle on the road causes the vehicle to move in a path parallel to and at said predetermined distance from said reference line, mounting a light source within the shell of the vehicle, mounting a mirror within the shell of the vehicle, providing an aperture positioned such that light from the light source can be reflected through the aperture and be incident on the sighting member, and covering the aperture with a transparent section of plastic.

* * * * *